United States Patent [19]
Palmer et al.

[11] Patent Number: 5,851,691
[45] Date of Patent: Dec. 22, 1998

[54] BATTERY SIZE ADAPTOR FOR PORTABLE APPARATUS

[75] Inventors: Keith J. Palmer, Cambridge; Ian D. Lewis, Fleet, both of England

[73] Assignee: U.S. Philips Corporation, New York, N.Y.

[21] Appl. No.: 960,393

[22] Filed: Oct. 29, 1997

[30] Foreign Application Priority Data

Oct. 30, 1996 [GB] United Kingdom .................... 9622611

[51] Int. Cl.$^6$ .................................................. H01M 2/10
[52] U.S. Cl. ................................ 429/97; 429/99; 429/123
[58] Field of Search ............................... 429/96–100, 123

[56] References Cited

U.S. PATENT DOCUMENTS

| | | | |
|---|---|---|---|
| 3,537,909 | 11/1970 | Horton | 429/99 X |
| 4,784,926 | 11/1988 | Sato | 429/96 |
| 4,842,966 | 6/1989 | Omori et al. | 429/96 |
| 5,552,240 | 9/1996 | Derstine | 429/96 |

OTHER PUBLICATIONS

Fractal Image Coding and Magnification Using Invariant Features, by D. Gotting et al., pp. 1–9. in Nato Advance Study Institute, Norway 1995. (No month).

*Primary Examiner*—Anthony Skapars
*Attorney, Agent, or Firm*—Jack D. Slobod

[57] ABSTRACT

An electrical apparatus, such as a pager, comprises a case having a battery holder in the form of a battery receiving recess of a size to receive the larger (or largest) of at least two coin-shaped batteries having respectively different predetermined diameters. A resiliently biased edge contact for bearing on the periphery of a battery protrudes through an aperture in a wall of the recess and another electrical contact is provided in the base of the recess. In order to adapt the battery holder to accommodate a smaller size of coin battery, resiliently biased battery locating abutment means are provided in the base of the recess at location(s) coinciding with the periphery of the smaller (or smallest) battery size when placed in the recess. The abutment means when extending into the recess maintain the smaller (or smallest) battery in contact with the resiliently biased edge contact but are depressed when the largest battery is placed in the recess. The recess is partially covered by a lip which enables the smaller battery to be maintained in engagement with the abutment means in spite of being deflected upwards by the another battery contact

9 Claims, 2 Drawing Sheets

5,851,691

BATTERY SIZE ADAPTOR FOR PORTABLE APPARATUS

BACKGROUND OF THE INVENTION

The present invention relates to a portable electrical apparatus, such as a pager, which is configured to accept coin-type of batteries having at least two different sizes and voltages.

It is known that the availability of particular sizes of coin batteries varies from country to country and in certain countries one size of battery is significantly more widely used than another size of battery and vice versa. Accordingly, for an electrical apparatus, such as a pager, which may be used in several countries it is important that it should be able to be operated with different sizes of coin batteries.

One possible type of adaptor is to have a plastics ring which is insertable into a battery receiving recess provided within the housing of the apparatus. The external diameter of the ring corresponds to the size of the larger or largest battery which can be placed in the recess and the inner circumference of the ring corresponds to the smaller size of cell. Rings having other inner circumferences can be for use with intermediate sizes of batteries. In each case the electrical contact with the battery would be against the opposite surfaces. A disadvantage of a battery adaptor comprising a separate ring is where to store it when using the larger size of battery because if it is misplaced then without it the smaller size of battery is likely to be displaced in the battery receiving recess of the equipment with the result that poor electrical contact with the battery occurs causing the apparatus to malfunction.

SUMMARY of the INVENTION

An object of the present of the present invention is to provide an electrical apparatus which is adaptable to be able to receive different sizes of coin-shaped batteries.

According to the present invention there is provided an electrical apparatus comprising a case having a battery receiving recess of a size to receive the larger(or largest) of at least two coin-shaped batteries having respectively different predetermined diameters, a resiliently biased edge contact for bearing on the periphery of a battery inserted into the recess, another electrical contact for bearing on a face of a battery when placed in the recess, and at least one resiliently biased battery locating abutment means disposed to extend heightwise into the recess at a location coinciding with the periphery of the smaller(or smallest) sized battery when placed in the recess, said abutment means maintaining the smaller(or smallest) battery in contact with the resiliently biased edge contact but being depressed when the larger(or largest) battery is placed in the recess.

In an embodiment of the present invention the edge contact is provided in the peripheral wall of the recess at a location lying on an imaginary line passing through the centers of the differently sized batteries when received in said recess. If desired there may be two resiliently biased battery locating abutments disposed one on each side of said imaginary line. The recess may be closed by a lid having means for depressing a battery located in the recess so that the edge of the battery engages the abutment means when the latter extends into the recess.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 2:
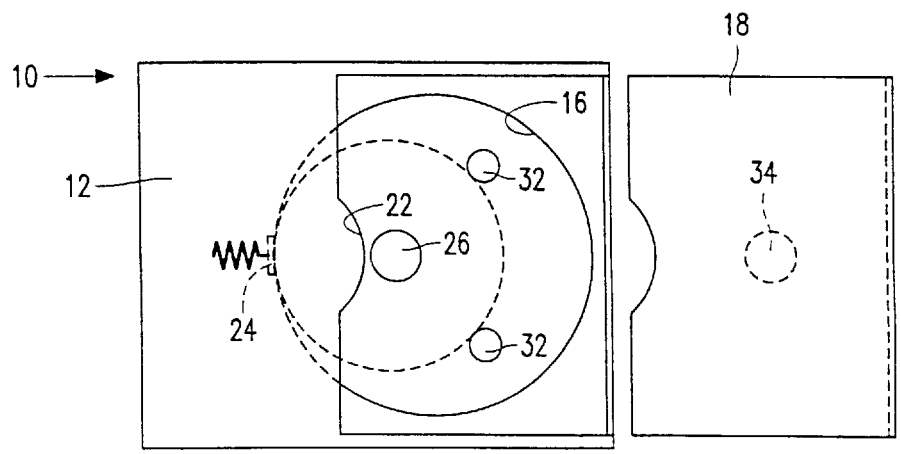
FIG. 2 is a top view of FIG. 1 with the battery cover removed and disposed to one side.

The pager 10 shown in the drawings comprises a case 12 containing an antenna and electronic circuitry (not shown) which enable the pager to operate in accordance with a suitable protocol such as the CCIR Radio paging Code No. 1 otherwise known as POCSAG. A battery holder 14 is provided by a recess 16 in the case 12, which recess 16 is covered by a slidably removable lid 18 (FIG. 2). The recess 16 is of circular cross-section and has a diameter corresponding to that of the larger or largest coin-type battery 20 to be used with the pager 10 and in the present embodiment the diameter will be of the order of 30 mm in order to accommodate a PR3032 battery which has a thickness of 3.2 mm. The recess 16 extends part-way into the body of the case 12 and is partially covered by an arcuate lip 22. A laterally moveable, resiliently biased positive contact 24 is located within the case 12 and is moveable radially into and out of the recess 16. A negative contact 26 is provided in the base 28 (FIGS. 3 and 4) of the recess in the form of a domed or partially spherical contact.

In order to be able to receive and hold in place a smaller size of battery 30 such as a PR2330 which has a 23 mm diameter and a thickness of 3.0 mm, two resiliently biased battery locating abutments 32 are provided in the base 28 of the recess. The abutments 32 comprise posts located on either side of a diameter passing through the positive contact 24 and at a position whereby when a smaller size of battery 30 is disposed in the recess 16 the posts hold the battery in position enabling a reliable electrical contact to be maintained between the positive and negative contacts and the battery 30.

Figure 3:
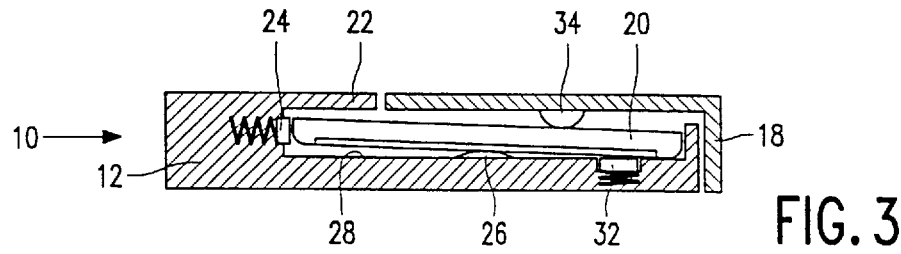
FIG. 3 is a diagrammatic cross-section through the pager having a larger size of battery disposed in the recess.

FIG. 3 shows a larger 30 mm battery located in the recess 16. In this configuration the abutments or posts 32 are depressed into the base of the recess and the resiliently biased positive contact 24 is urged against the edge of the coin battery. The negative contact 26 which is located in a semi-circular shaped area of the recess 16 closer to the positive contact 24 deflects the battery upwards, which upward deflection is limited by the extended arcuate lip 22 of the case 12.

Figure 4:
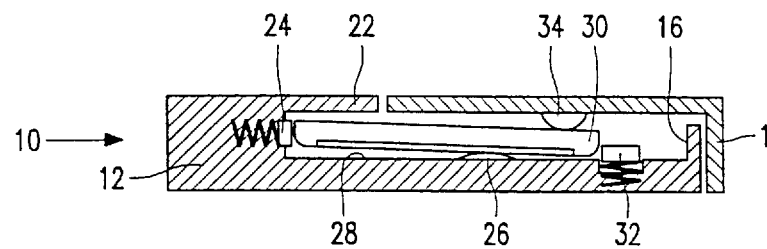
FIG. 4 is another diagrammatic cross-section of the pager having a smaller size of battery disposed in the recess.

Referring to FIG. 4, when using a smaller battery 30, such as a PR2330, this is inserted into the recess 16 and pushed towards the positive contact 24 thereby enabling the resiliently biased abutments or posts 32 to hold the battery 30 in engagement with the positive contact 24. By the negative contact 26 deflecting the battery 30 upwards towards the lip 20, the risk of the battery being pushed laterally over the abutments by the force of the spring coupled to the positive contact 24 is reduced.

In reality the space between the lid 18 and the battery 20 or 30 is smaller than that shown in the diagrams of FIGS. 3 and 4 so that in the case of FIG. 4 any tendency for the battery to be pushed over the abutments 32 is counteracted by the lid 18 bearing on the portion of the periphery of the battery remote from the positive contact 24. Optionally a counteractive force applying means may be provided on the underside of the lid in the form of a dimple or other protrusion 34 from the underside of the lid.

The embodiment described is capable of being used with a battery having a slightly smaller diameter than 23 mm, such as 20 mm, and when using such a battery the resiliently biased positive contact 24 extends sufficiently far into the recess as to urge the battery against the upstanding abutments 32.

Figure 1:
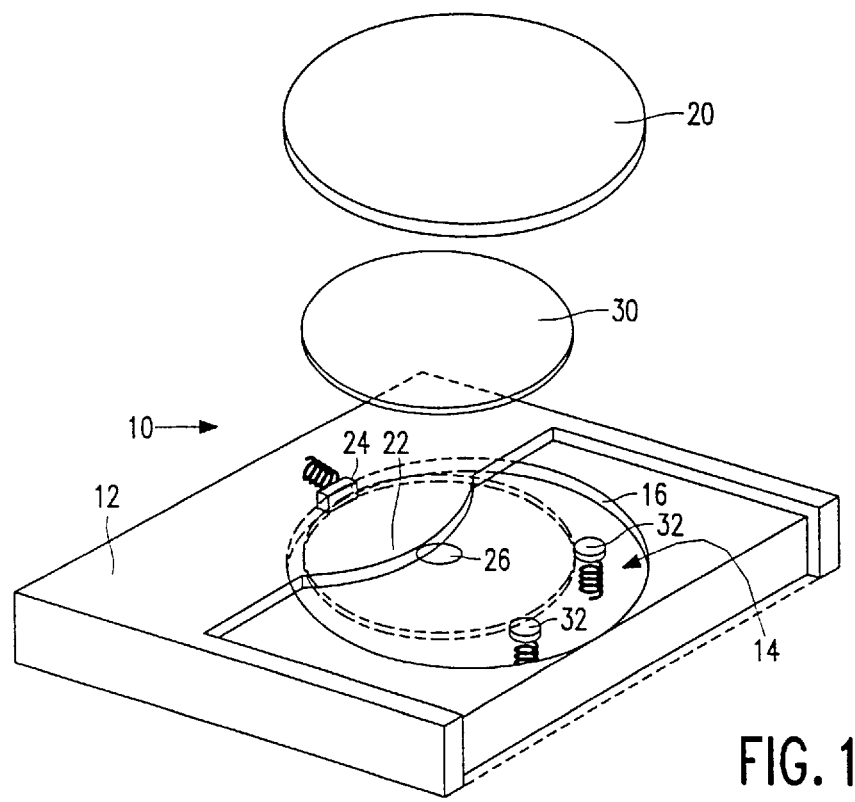
FIG. 1 is a diagrammatic perspective view of a pager with the battery cover removed and two differently sized batteries arranged above the pager.
Figure 5:
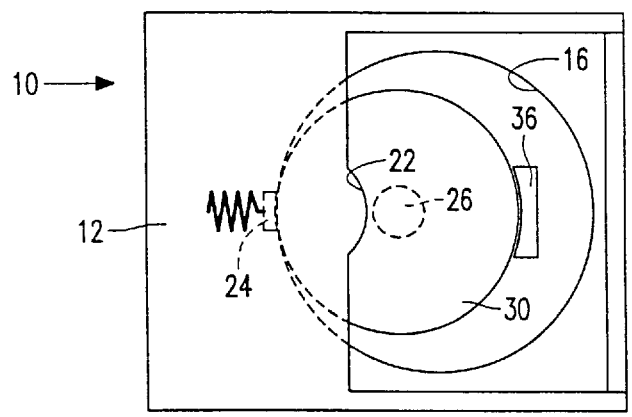
FIG. 5 shows a top view of the pager with the cell cover removed showing one resiliently biased abutment.
Figure 6:
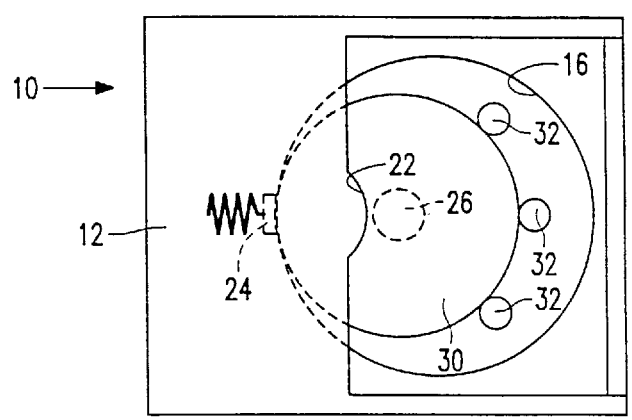
FIG. 6 shows a top view of the pager with the cell cover removed showing three resiliently biased abutments.

Although two abutments 32 have been shown in FIGS. 1 and 2, FIG. 5 shows the use a single larger abutment 36 having an edge shaped to conform to the circumference of the smaller battery 30 and FIG. 6 shows an embodiment having three abutments 32. A larger number of abutments may be provided subject to space considerations in the case.

By using batteries of different sizes, these may also have different voltages and either the pager includes a manually operable voltage selector (not shown) or a voltage sensing circuit, which in the case of a low voltage being selected or sensed, causes the voltage to be boosted as required.

Although the present invention has been described with reference to a pager, it is to be understood that it could be applied to other electrical apparatus such as a cellular or cordless telephone, pocket memo and circuit boards carrying memory chips.

From reading the present disclosure, other modifications will be apparent to persons skilled in the art. Such modifications may involve other features which are already known in the design, manufacture and use of battery powered electrical apparatus and component parts thereof and which may be used instead of or in addition to features already described herein.

What is claimed is:

1. An electrical apparatus comprising a case having a battery receiving recess of a size to receive the larger of at least two coin-shaped batteries having respectively different predetermined diameters, a resiliently biased electrical edge contact for bearing on the periphery of a battery inserted into the recess, another electrical contact for bearing on a face of a battery when placed in the recess, and at least one resiliently biased battery locating abutment means disposed to extend heightwise into the recess at a location coinciding with the periphery of the smaller sized battery when placed in the recess, said abutment means maintaining the smaller battery in contact with the resiliently biased edge contact but being depressed when the larger battery is placed in the recess.

2. An electrical apparatus as claimed in claim 1, wherein the edge contact is provided in the wall of the recess at a location lying on an imaginary line passing through the centers of the differently sized batteries when placed in the recess.

3. An electrical apparatus as claimed in claim 2, wherein there are provided two resiliently biased battery locating abutment means disposed one on each side of said imaginary line.

4. An electrical apparatus as claimed in claim 3, wherein the another electrical contact comprises a button contact fixedly mounted in a base of the recess at a position within a semi-circular area of the recess closer to the resiliently biased edge contact.

5. An electrical apparatus as claimed in claim 4, wherein the surface of the case is extended to form a lip over the resiliently biased edge contact.

6. An electrical apparatus as claimed in claim 5, wherein there is provided a lid for closing the recess, the lid having means for depressing a battery located in the recess so that the edge of the battery engages the abutment means when extended.

7. An electrical apparatus as claimed in claim 1, wherein the another electrical contact comprises a button contact fixedly mounted in a base of the recess at a position within a semi-circular area of the recess closer to the resiliently biased edge contact.

8. An electrical apparatus as claimed in claim 1, wherein the surface of the case is extended to form a lip over the resiliently biased edge contact and in that there is provided a lid for closing the recess, the lid having means for depressing a battery located in the recess so that the edge of the battery engages the abutment means when extended.

9. An electrical apparatus as claimed in claim 1, wherein the another electrical contact comprises a button contact fixedly mounted in a base of the recess at a position within a semi-circular area of the recess closer to the resiliently biased edge contact, in that the surface of the case is extended to form a lip over the resiliently biased edge contact, and in that there is provided a lid for closing the recess, the lid having means for depressing a battery located in the recess so that the edge of the battery engages the abutment means when extended.

\* \* \* \* \*